(12) United States Patent  
Martin et al.

(10) Patent No.: US 10,809,799 B2  
(45) Date of Patent: Oct. 20, 2020

(54) SYSTEMS AND METHODS FOR ESTIMATING AN OBJECT OF FIXATION

(71) Applicant: HONDA MOTOR CO., LTD., Tokyo (JP)

(72) Inventors: Sujitha Martin, Sunnyvale, CA (US); Ashish Tawari, Santa Clara, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 15/986,546

(22) Filed: May 22, 2018

(65) Prior Publication Data

US 2019/0361522 A1 Nov. 28, 2019

(51) Int. Cl.  
*G06K 9/00* (2006.01)  
*G06F 3/01* (2006.01)  
*G06N 5/04* (2006.01)

(52) U.S. Cl.  
CPC ......... *G06F 3/013* (2013.01); *G06K 9/00597* (2013.01); *G06K 9/00671* (2013.01); *G06N 5/046* (2013.01); *G06T 2207/20081* (2013.01)

(58) Field of Classification Search  
CPC ............................ G06F 3/013; G06K 9/00597; G06K 9/00671; G06N 5/046; G06T 2207/20081  
See application file for complete search history.

(56) References Cited

U.S. PATENT DOCUMENTS

2019/0077308 A1* 3/2019 Kashchenko ......... G06F 3/0304

OTHER PUBLICATIONS

Fletcher, Luke, et al. "Correlating driver gaze with the road scene for driver assistance systems." Robotics and Autonomous Systems 52.1 (2005): 71-84. (Year: 2005).*  
Abdelgawad, K., et. al., "Networked Driving Simulation: Applications, State of the Art, and Design Considerations," MDPI Journal Designs, Jun. 2017.  
Ablabmeier, M, et. al., "Eye Gaze Studies Comparing Head-up and Head Down Displays in Vehicles," Munich University of Technology, Institute for Human-Machine-Communication, pp. 2250-2252, 2007.  
Fischler, M., et. al., "Random Sample Consensus: A Paradiam for Model Fitting with Applications to Image Analysis and Automated Cartography," Artificial Intelligence Center, Mar. 1980.  
He, K., et al., "Mask R-CNN," ICCV, Facebook AI Research, pp. 2961-2969.

(Continued)

*Primary Examiner* — Nirav G Patel  
(74) *Attorney, Agent, or Firm* — Arent Fox LLP (57) ABSTRACT

Systems and methods for estimating an object of fixation from a gaze of a driver. The method includes: receiving image data from a plurality of input devices; processing the image data from a first one of the plurality of input devices to identify an object track; analyzing the image data from a second one of the plurality of input devices and the image data from the first one of the plurality of input devices to determine a projected gaze of a driver; analyzing the object track and the projected gaze to identify a plurality of objects in the gaze of the driver; performing a probability analysis to estimate the object of fixation from among the plurality of objects; and generating an output image identifying the estimated object of fixation.

18 Claims, 5 Drawing Sheets

(56) References Cited

OTHER PUBLICATIONS

Mourant, R., "Strategies of Visual Search by Novice and Experienced Drivers," Dissertation, the Ohio State University, 1971.

Palazzi, A., et. al., "Learning Where to Attend Like a Human Driver," IEEE Intelligent Vehicles Symposium (IV), 2017.

Platt, J., "Probabilistic Outputs for Support Vector Machines and Comparisons to Regularized Likelihood Methods," Microsoft Research, Mar. 26, 1999.

Underwood, G., et. al., "Visual Attention While Driving Sequences of Eye Fixations Made by Experienced and Novice Drivers," Ergonomics, 46, pp. 629-646, 2003.

Wickens, C., et. al., "In-Vehicle Glance Duration: Distributions, Tails and Model of Crash Risk," Transportation Research Record Journal of the Transportation Research Board, Dec. 2007.

Purucker, C., et. al., "Evaluating Distraciion of in-Vehicle Information Systems while Driving by Predicting Total Eyes-off-Road Times with Keystroke Level Modeling," Applied Ergonomics, 58, pp. 543-554, 2017.

Tawari, A., et. al., "A Computational Framework for Driver's Visual Attention Using a Fully Convolutional Architecture," IEEE, Intelligent Vehicles Symposium (IV), 2017.

\* cited by examiner

SYSTEMS AND METHODS FOR ESTIMATING AN OBJECT OF FIXATION

TECHNICAL FIELD

The disclosure herein generally relates to methods and systems for estimating an object of fixation.

BACKGROUND

Driving may be a visually demanding task, where drivers predominantly gather information relevant to driving tasks by maintaining a visual gaze on objects or regions of interest for a certain time period. This may be referred to as fixation. Determining when the fixation occurs, what the fixation is on, and/or the duration of the fixation may be critical information and may provide a greater understanding of what factors the driver uses in decision making while driving. For example, repeated fixation on the same object may indicate relative importance of the object with respect to the scene. Such knowledge may be used to analyze and assign importance to different elements of the scene, which may be used in Advanced Driver Assistance Systems (ADAS) or in autonomous vehicles for better decision making.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure is directed to a system for estimating an object of fixation from a gaze of a driver. The system may include a memory that stores instructions for executing processes for estimating the object of fixation from the gaze of the driver and a processor configured to execute the instructions. The processes may include: receiving image data from a plurality of input devices; processing the image data from a first one of the plurality of input devices to identify an object track; analyzing the image data from a second one of the plurality of input devices and the image data from the first one of the plurality of input devices to determine a projected gaze of a driver; analyzing the object track and the projected gaze to identify a plurality of objects in the gaze of the driver; performing a probability analysis to estimate the object of fixation from among the plurality of objects; and generating an output image identifying the estimated object of fixation.

In another aspect, the present disclosure is directed to a method for estimating an object of fixation from a gaze of a driver. The method may include receiving image data from a plurality of input devices; processing the image data from a first one of the plurality of input devices to identify an object track; analyzing the image data from a second one of the plurality of input devices and the image data from the first one of the plurality of input devices to determine a projected gaze of a driver; analyzing the object track and the projected gaze to identify a plurality of objects in the gaze of the driver; performing a probability analysis to estimate the object of fixation from among the plurality of objects; and generating an output image identifying the estimated object of fixation.

In a further aspects, the present disclosure is directed to a non-transitory computer-readable storage medium containing executable computer program code for estimating an object of fixation from a gaze of a driver. The code may cause a computing device to: receive image data from a plurality of input devices; process the image data from a first one of the plurality of input devices to identify an object track; analyze the image data from a second one of the plurality of input devices and the image data from the first one of the plurality of input devices to determine a projected gaze of the driver; analyze the object track and the projected gaze to identify a plurality of objects in the gaze of the driver; perform a probability analysis to estimate the object of fixation from among the plurality of objects; and generate an output image identifying the estimated object of fixation.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, the present disclosure provides systems and methods for estimating an object of fixation using a system architecture that identifies object tracks in image data, derives object characteristics independent of and jointly with gaze behavior, and utilizes a spatio-temporal sensitive machine learning framework to estimate the likelihood of an object being the object of fixation. For example, the present disclosure provides for a machine vision framework to determine the object of fixation based on on-road driving data, where objects are dynamic in nature.

Figure 1:
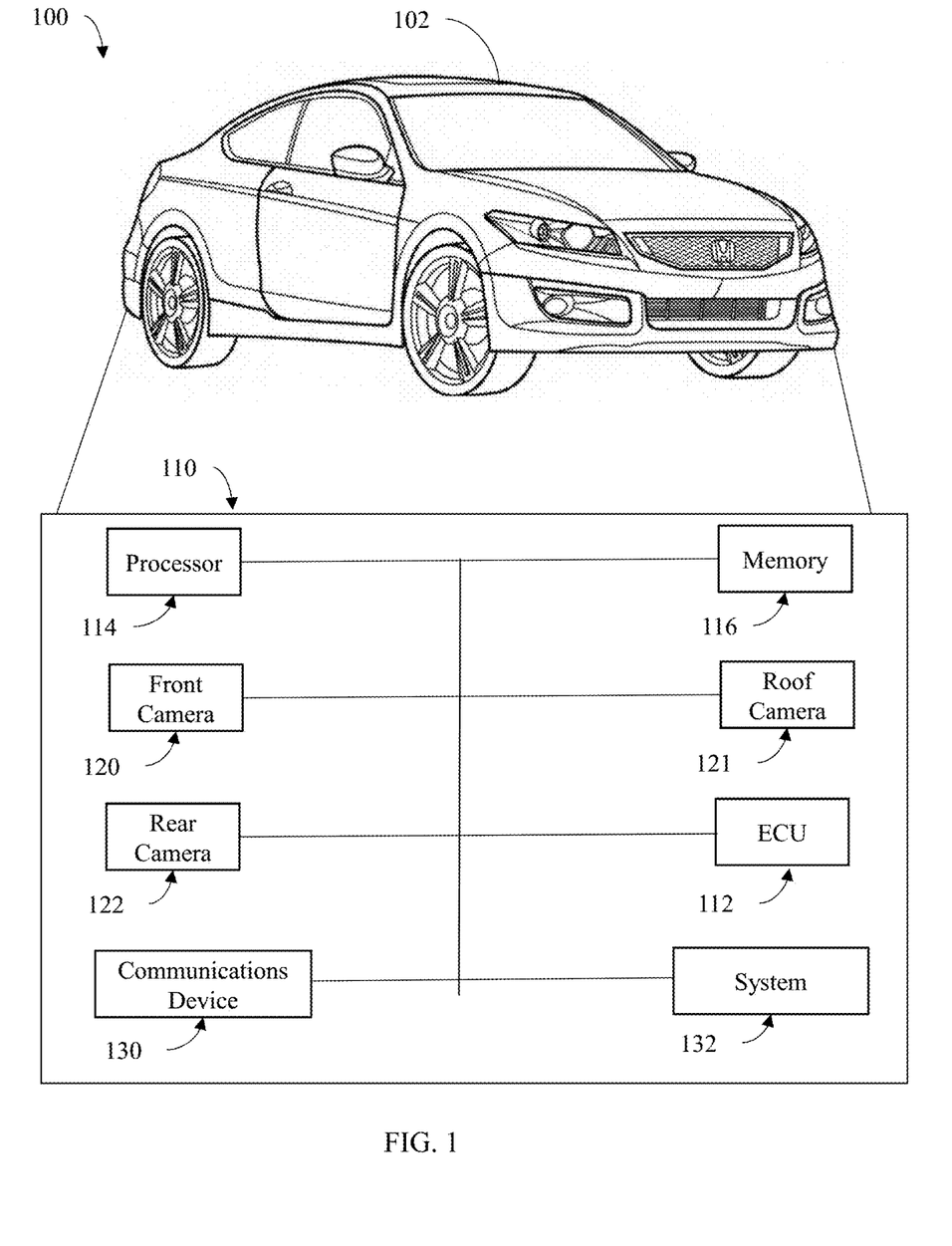
FIG. 1 illustrates a schematic view of an example operating environment of a vehicle system in accordance with aspects of the present disclosure.

Turning to FIG. 1, a schematic view of an example operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the vehicle system 110, among others, including vehicle HVAC systems, vehicle audio systems, vehicle video systems, vehicle infotainment systems, vehicle telephone systems, and the like. The vehicle system 110 may include a front camera or other image-capturing device (e.g., a scanner) 120, roof camera or other image-capturing device (e.g., a scanner) 121, and rear camera or other image capturing device (e.g., a scanner) 122 that may also be connected to the ECU 112 to provide images of the environment surrounding the vehicle 102. The vehicle system 110 may also include a processor 114 and a memory 116 that communicate with the front camera 120, roof camera 121, rear camera 122, head lights 124, tail lights 126, communications device 130, and automatic driving system 132.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include a front camera 120, a roof camera 121, and a rear camera 122 (collectively referred to as cameras 120-122). Each of the cameras 120-122 may be a digital camera capable of capturing one or more images or image streams, or may be another image capturing device, such as a scanner. In some aspects, the front camera 120 may be a dashboard camera configured to capture an image of an environment directly in front of the vehicle 102, the roof camera 121 may be a camera configured to broader view of the environment in front of the vehicle 102, and the rear camera 122 may be configured to capture an image of an environment directly in behind of the vehicle 102. The cameras 120-122 may also provide the image to a driving system 132 and/or a remote system. Additionally, the vehicle 102 may collect data from one or more wearable device (not shown), such as an eye tracking device, worn by a driver of the vehicle 102. In some aspects, the wearable device may provide both the driver's perspective view and the direction in which the driver is looking within the frame of reference. In turn, the vehicle 102 may provide the data collected by the wearable device to the driving system 132 and/or the remote system.

Figure 2:
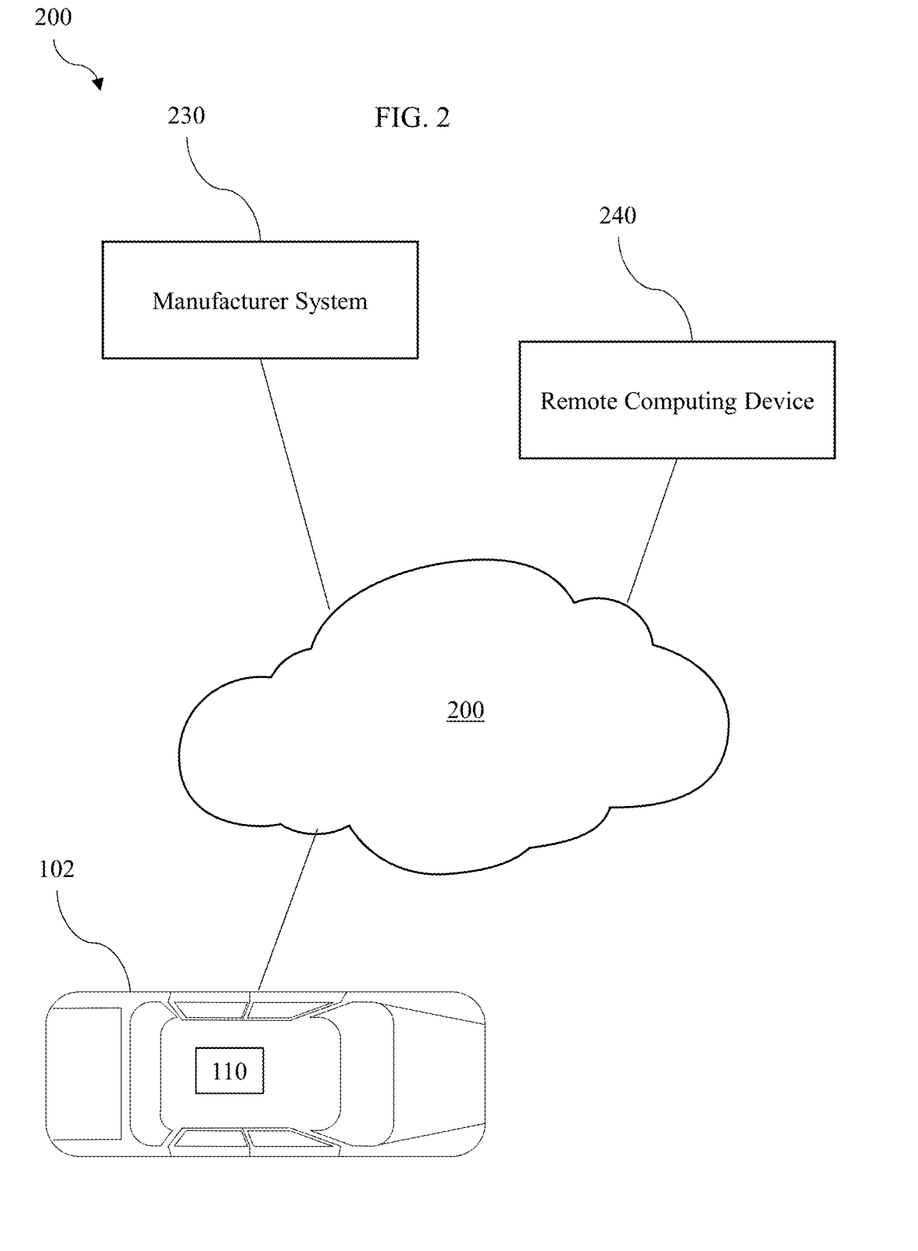
FIG. 2 illustrates an exemplary network for communicating between a plurality of systems in accordance with aspects of the present disclosure.

FIG. 2 illustrates an exemplary network 200 for facilitating communications between multiple systems. For example, the network 200 may include the Internet or another internet protocol (IP) based network. The network 200 may enable the vehicle system 110, a manufacturer system 230, and a remove computing device 240 to communicate with one another. For example, the vehicle system 110 may communicate with the network 200 via the communications device 130. The vehicle system 110 may, for example, transmit images captured by the cameras 120-122, as well as the wearable device, to the manufacturer system 230.

The manufacturer system 230 and the remote computing device may include a computer system, as shown with respect to FIG. 3 described below, associated with one or more vehicle manufacturers or dealers. The manufacturer system 230 may also include a memory that stores instructions for executing processes for estimating an object of fixation from a gaze of a driver and a processor configured to execute the instructions.

In some aspects, the manufacturer system 230 may be configured to receive image data from the cameras 120-122 and the wearable device. Upon receipt of the image data from the cameras 120-122 and wearable devices, the manufacturer system 230 may store the image data in one or more storage devices.

Figure 3:
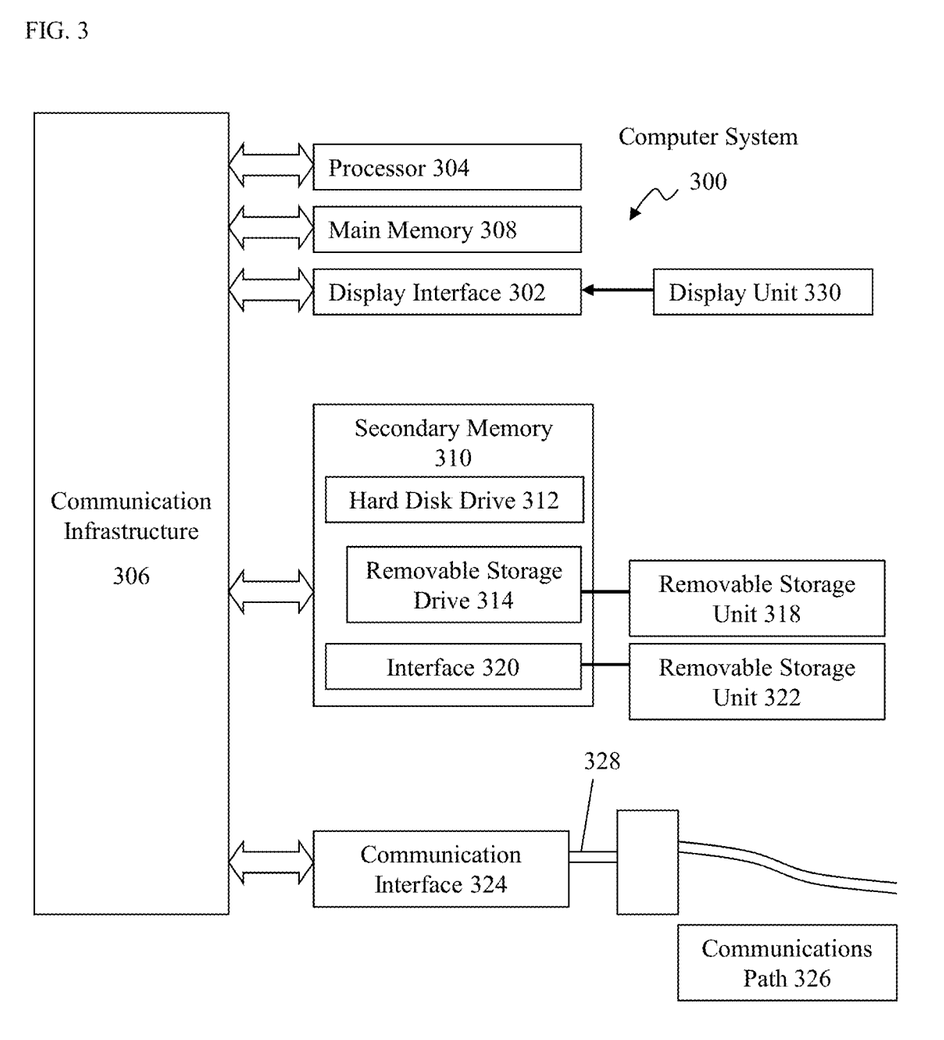
FIG. 3 illustrates various features of an example computer system for use in conjunction with aspects of the present disclosure.
Figure 5A:
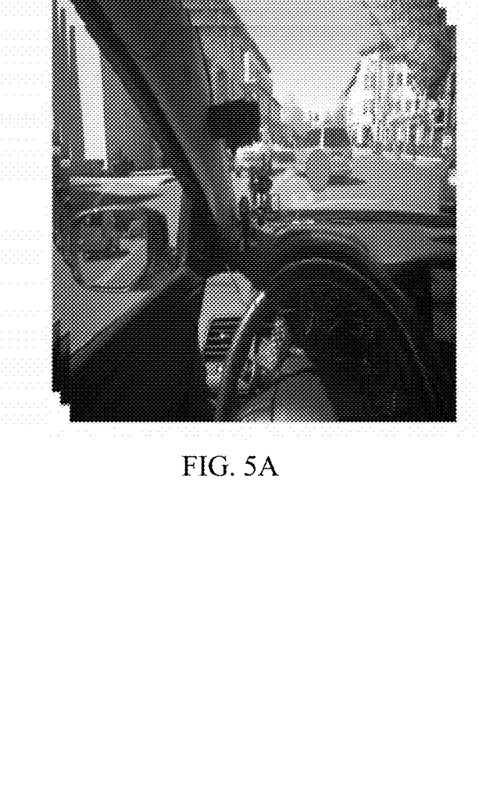
FIGS. 5A-B illustrate exemplary in accordance with aspects of the present disclosure.
Figure 5B:
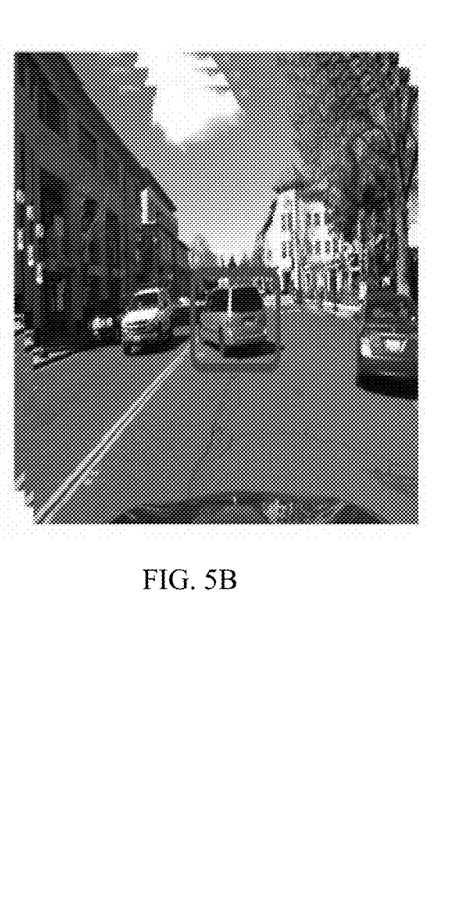

Additionally, the manufacturer system 230 may display the received image data on a display unit, as described in further detail with respect to FIG. 3, and receive annotations from a plurality of users via an input device. In some aspects, the annotations may be markings on the image data identifying one or more objects in the image data. For example, as illustrated in FIGS. 5A-B, the annotations may be a dot or a box surrounding a vehicle in an image. In some aspects, the annotations may be directed to potential objects of fixation in the image data. Alternatively, or in addition, the manufacturer system 230 may transmit the received image data to the remote computing device, such that the plurality of users may annotate the image data at a different location than the manufacturer system 230. In some aspects, the annotations from each of the plurality of users may be received independent of one another, and each user may have access to a synchronized view of a driver perspective and a fixed car perspective with instantaneous gaze overlaid on the driver perspective. In some aspect, the annotations may include a bounding box around an object of fixation for the entire duration of the fixation. In this way, the annotations may be used to mark the beginning and end of a fixation and to label the object of fixation within the marked fixation window.

After receiving the annotations from the plurality of users, the manufacturer system 230 may merge the annotations to determine when and where annotations from the plurality of users are consistent. To achieve this, the manufacturer system 230 may work on a frame level where the output bounding box from each user may be checked, and the manufacturer system 230 may acknowledge an object of fixation if there is sufficient overlap. In some aspects. the manufacturer system 230 may determine that there is sufficient overlap when a merger of the annotations is over a threshold. For example, the threshold may include a number of common annotations for the image data. In further aspects, when the merger of the annotations is over the threshold, the manufacturer system 230 may set an intersecting area between annotations as the new ground truth bounding box, e.g., a bounding box illustrating where an object is located in the image data, for determining the object of fixation. In some aspects, merging the annotations may occur on a frame level, and as such, a set of frames may belong to one continuous fixation when all of the frames in the set belong to a singular fixation in the annotations from each of the plurality of users.

The manufacturer system 230 may determine an object of fixation based on the new ground truth bounding box. To achieve this, for a given time window of fixation, the manufacturer system 230 may identify object tracks in the image data, characterize the joint dynamics of gaze and individual objects, and train a machine learning framework that learns to assign a probability to individual objects based on the object being the object of fixation.

In some aspects, the manufacturer system 230 may analyze the image data to detect objects relevant in the driving context. For this, the manufacturer system 230 may apply a Mask Region-based Convolutional Neural Network (RCNN) on the image data from the cameras 120-122. For example, the Mask RCNN may be applied independently on each video frame of each intersection segments, where the outputs of the Mask RCNN may be two-dimensional (2D) bounding boxes of objects, a class of each object, and a pixel-wise instance-level segmentation of each object. In various aspects, a plurality of classes may be identifiable, such as persons, bicycles, cars, motorcycles, buses, trucks, traffic lights, and stop signs, whose presence highly influence the task of driving and therefore gaze behavior of driver.

In further aspects, the manufacturer system 230 may associate an object appearing over multiple frames in a given fixation window with a unique identification using, for example, tracking by detection. In some aspects, the tracking by detection may be initialized at the start of each fixation window by automatically assigning all detected objects to unique tracks, and each detected box in subsequent frames may be matched to existing tracks based on an overlap. In further aspects, when a matched overlap is below a threshold, the manufacturer system 230 may create new tracks. In still further aspects, the manufacturer system 230 may, at every frame, remove tracks with no recent updates.

In further aspects, the manufacturer system 230 may extract characteristics of the object tracks with respect to gaze behavior using a joint analysis of gaze and object dynamics. In some aspects, the joint analysis of gaze and object dynamics may include generating a gaze registration, which is based on a driver's perspective captured by a wearable device. In further aspects, the object dynamics may be based on perspective from the cameras 120-122. In still further aspects, the driver perspective and vehicle perspective may be synchronized, such that the driver's eye gaze may be mapped onto the vehicle perspective.

In some aspects, generating the gaze registration may include extracting dense key points from the perspectives, e.g., the image data, from each of the wearable device and the cameras 120-122, matching points between each perspective based on a descriptor similarity, applying a fundamental matrix to determine inliers within matching pairs, and estimating a homography transformation matrix to project gaze onto the perspective from the cameras 120-122. As a result, a projected gaze may be in the same frame of reference as the identified object tracks. In some aspects, for each object track, the manufacturer system 230 may extract one or more of the following object characteristics:

Gaze distance to object center: a vector of euclidean distance between gaze and object center for each instance in the object track;

Gaze distance to object bounding box: a vector of euclidean distance between gaze and bounding box of object, for each instance in the object track, where the distance may be greater than zero when outside the box and the distance may be set to zero when within the box;

Gaze distance to object contour: a vector of euclidean distance between gaze and contour of object, as obtained from pixel-wise segmentation, for each instance in the object track, where the distance may be greater than zero when outside the contour and the distance may be set to zero when within the contour; and Object Importance: a depth based importance assignment scheme, where a closer object at a given time may be more relevant. In some aspects, a rank of the objects based on their normalized pixel height is used as a measure of object importance. The normalized pixel height may be the pixel height of the object of the same class at a given fixed distance.

In some aspects, the manufacturer system 230 may use a combination of these object characteristics to capture varying information about the joint dynamics of gaze and object dynamics, as well as object relevance. In some aspects, the length one or more of these characteristics may vary based on the length of the object track.

In further aspects, the manufacturer system 230 may resolve the varying length of the object characteristics by using a probabilistic model to estimate a probability that a given object is the object of fixation. For example, for a given time window of fixation, a tracked duration of object tracks in the image data may vary, thereby causing the length of object characteristics to vary. This variation may be the result of the duration of fixation, occlusion of the object, noise in detection or tracking, etc. To estimate the likelihood that a given object is the object of fixation, the manufacturer system 230 may transform a varying length input to a fixed length by computing statistics, such as a mean, a standard deviation, a minimum, a maximum, a range, and a lower-, a median-, and an upper-quartile, over the time window. The manufacturer system 230 may also train a binary Support Vector Machine (SVM) for each combination of object characteristics on two classes: 1) object of fixation and 2) background object. In some aspects, any object that is not the object of fixation within a given window of fixation may be categorized as a background object.

The manufacturer system 230 may then determine the object of fixation based on the trained probabilistic model and generate an output identifying the object of fixation. For example, the manufacturer system 230 may generate an output image which identifies the object of fixation in the output image.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 300 is shown in FIG. 3.

Computer system 300 includes one or more processors, such as processor 304.

The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present invention may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324.

Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present invention are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present invention, as discussed herein. In particular, the computer programs, when executed, enable the processor 304 to perform the features in accordance with aspects of the present invention. Accordingly, such computer programs represent controllers of the computer system 300.

In an aspect of the present invention where the invention is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
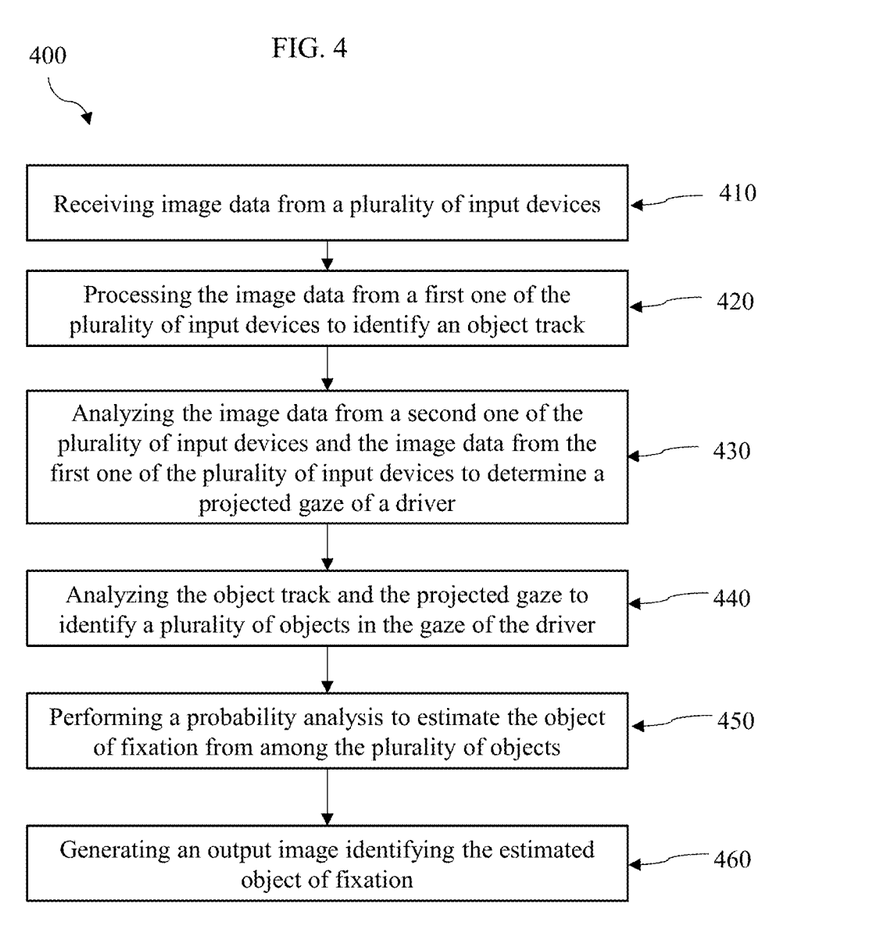
FIG. 4 illustrates a flowchart of a method of estimating an object of fixation from a gaze of a driver in accordance with aspects of the present disclosure.

FIG. 4 illustrates a flowchart of a method for estimating an object of fixation from a gaze of a driver. The method may include receiving image data from a plurality of input devices 410. The input devices may be one or more cameras coupled to a vehicle and/or an wearable, image-capturing device worn by a driver. The method also includes processing the image data from the one or more cameras coupled to the vehicle to identify an object track 420. For example, identifying the object track may include analyzing the image data from the one or more cameras to detect objects relevant in the driving context. To achieve this, a Mask Region-based Convolutional Neural Network (RCNN) may be applied to the image data from the one or more cameras. In some aspects, the Mask RCNN may be applied independently on each video frame of each intersection segments, where the outputs of the Mask RCNN may be two-dimensional (2D)

bounding boxes of objects, a class of each object, and a pixel-wise instance-level segmentation of each object.

The method further includes analyzing the image data from the wearable, image-capturing device worn by the driver and the image data from the one or more cameras coupled to the vehicle to determine a projected gaze of a driver 430. In some aspects, determining the projected gaze of the driver may include extracting dense key points from the image data from each of the wearable device and the one or more cameras, matching points between each perspective based on a descriptor similarity, applying a fundamental matrix to determine inliers within matching pairs, and estimating a homography transformation matrix to project gaze onto the perspective from the one or more cameras.

The method further includes analyzing the object track and the projected gaze to identify a plurality of objects in the gaze of the driver 440. The method also includes performing a probability analysis to estimate the object of fixation from among the plurality of objects 450. For example, for a given time window of fixation, a tracked duration of object tracks in the image data may vary, thereby causing the length of object characteristics to vary. This variation may be the result of the duration of fixation, occlusion of the object, noise in detection or tracking, etc. Thus, estimating the object of fixation from among the plurality of objects may include transforming a varying length input to a fixed length by computing statistics and training a binary Support Vector Machine (SVM) for each combination of object characteristics on two classes: 1) object of fixation and 2) background object. In some aspects, any object that is not the object of fixation within a given window of fixation may be categorized as a background object. The method may also include generating an output image identifying the estimated object of fixation 460.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system for estimating an object of fixation from a gaze of a driver, the system comprising:
   a memory that stores instructions for executing processes for estimating the object of fixation from the gaze of the driver; and
   a processor configured to execute the instructions, wherein the processes comprise:
   receiving image data from a plurality of input devices;
   processing the image data from a first one of the plurality of input devices to identify an object track;
   analyzing the image data from a second one of the plurality of input devices and the image data from the first one of the plurality of input devices to determine a projected gaze of a driver;
   analyzing the object track and the projected gaze to identify a plurality of objects in the gaze of the driver;
   performing a probability analysis to estimate the object of fixation from among the plurality of objects;
   generating an output image identifying the estimated object of fixation;
   receiving annotations to the image data from a plurality of users, the annotations identifying potential objects of fixation in the image data; and
   merging the annotations from the plurality of users to establish a ground truth bounding box for the image data, wherein the object of fixation is based on the ground truth bounding box.

2. The system of claim 1, wherein processing the image data from the first one of the plurality of input devices to identify the object track comprises;
   applying a neural network on each frame from of the image data from the first one of the plurality of input devices; and
   associating an object appearing over multiple frames in a given fixation window with a unique identification.

3. The system of claim 2, wherein the neural network comprises a Mask Region-based Convolutional Neural Network.

4. The system of claim 2, wherein determining the projected gaze of a driver comprises:
   extracting dense key points from the respective image data from the plurality of input devices;
   identifying matching dense key points from the respective image data from the plurality of input devices;
   determining inliers between matching dense key points; and
   applying a transformation matrix to the inliers to determine the projected gaze, wherein the projected gaze is in a same reference frame as the object track.

5. The system of claim 4, wherein the processes further comprise:
   training a probabilistic model to perform the probability analysis, wherein training the probabilistic model comprises:
   extracting a plurality of object characteristics for the object track, the plurality of object characteristics being of variable length;
   converting the plurality of object characteristics of variable length into a fixed length; and
   training a binary Support Vector Machine (SVM) for the plurality of object characteristics based on a plurality of classes comprising a first class including objects of fixation and a second class including background objects.

6. The system of claim 1, wherein:
   the first one of the plurality of input devices comprises an image-capturing device coupled to the vehicle; and
   the second one of the plurality of input devices comprises a wearable device worn by the driver.

7. A method for estimating an object of fixation from a gaze of a driver, the method comprising:
   receiving image data from a plurality of input devices;
   processing the image data from a first one of the plurality of input devices to identify an object track;
   analyzing the image data from a second one of the plurality of input devices and the image data from the first one of the plurality of input devices to determine a projected gaze of a driver;
   analyzing the object track and the projected gaze to identify a plurality of objects in the gaze of the driver;
   performing a probability analysis to estimate the object of fixation from among the plurality of objects;
   generating an output image identifying the estimated object of fixation;
   receiving annotations to the image data from a plurality of users, the annotations identifying potential objects of fixation in the image data; and
   merging the annotations from the plurality of users to establish a ground truth bounding box for the image data, wherein the object of fixation is based on the ground truth bounding box.

8. The method of claim 7, wherein processing the image data from the first one of the plurality of input devices to identify the object track comprises;
applying a neural network on each frame from of the image data from the first one of the plurality of input devices; and
associating an object appearing over multiple frames in a given fixation window with a unique identification.

9. The method of claim 8, wherein the neural network comprises a Mask Region-based Convolutional Neural Network.

10. The method of claim 8, wherein determining the projected gaze of a driver comprises:
extracting dense key points from the respective image data from the plurality of input devices;
identifying matching dense key points from the respective image data from the plurality of input devices;
determining inliers between matching dense key points; and
applying a transformation matrix to the inliers to determine the projected gaze, wherein the projected gaze is in a same reference frame as the object track.

11. The method of claim 10, further comprising:
training a probabilistic model to perform the probability analysis, wherein training the probabilistic model comprises:
extracting a plurality of object characteristics for the object track, the plurality of object characteristics being of variable length;
converting the plurality of object characteristics of variable length into a fixed length; and
training a binary Support Vector Machine (SVM) for the plurality of object characteristics based on a plurality of classes comprising a first class including objects of fixation and a second class including background objects.

12. The method of claim 7, wherein:
the first one of the plurality of input devices comprises an image-capturing device coupled to the vehicle; and
the second one of the plurality of input devices comprises a wearable device worn by the driver.

13. A non-transitory computer-readable storage medium containing executable computer program code for estimating an object of fixation from a gaze of a driver, the code comprising instructions configured to cause a computing device to:
receive image data from a plurality of input devices;
process the image data from a first one of the plurality of input devices to identify an object track;
analyze the image data from a second one of the plurality of input devices and the image data from the first one of the plurality of input devices to determine a projected gaze of the driver;
analyze the object track and the projected gaze to identify a plurality of objects in the gaze of the driver;
perform a probability analysis to estimate the object of fixation from among the plurality of objects;
generate an output image identifying the estimated object of fixation;
receive annotations to the image data from a plurality of users, the annotations identifying potential objects of fixation in the image data; and
merge the annotations from the plurality of users to establish a ground truth bounding box for the image data, wherein the object of fixation is based on the ground truth bounding box.

14. The medium of claim 13, wherein processing the image data from the first one of the plurality of input devices to identify the object track comprises;
applying a neural network on each frame from of the image data from the first one of the plurality of input devices; and
associating an object appearing over multiple frames in a given fixation window with a unique identification.

15. The medium of claim 14, wherein determining the projected gaze of a driver comprises:
extracting dense key points from the respective image data from the plurality of input devices;
identifying matching dense key points from the respective image data from the plurality of input devices;
determining inliers between matching dense key points; and
applying a transformation matrix to the inliers to determine the projected gaze, wherein the projected gaze is in a same reference frame as the object track.

16. The medium of claim 15, further comprising:
training a probabilistic model to perform the probability analysis, wherein training the probabilistic model comprises:
extracting a plurality of object characteristics for the object track, the plurality of object characteristics being of variable length;
converting the plurality of object characteristics of variable length into a fixed length; and
training a binary Support Vector Machine (SVM) for the plurality of object characteristics based on a plurality of classes comprising a first class including objects of fixation and a second class including background objects.

17. The medium of claim 13, wherein:
the first one of the plurality of input devices comprises an image-capturing device coupled to the vehicle; and
the second one of the plurality of input devices comprises a wearable device worn by the driver.

18. A method for estimating an object of fixation from a gaze of a driver, the method comprising:
receiving image data from a plurality of input devices;
processing the image data from a first one of the plurality of input devices to identify an object track;
analyzing the image data from a second one of the plurality of input devices and the image data from the first one of the plurality of input devices to determine a projected gaze of a driver;
analyzing the object track and the projected gaze to identify a plurality of objects in the gaze of the driver;
performing a probability analysis to estimate the object of fixation from among the plurality of objects;
generating an output image identifying the estimated object of fixation;
receiving annotations to the image data from a plurality of users, the annotations identifying potential objects of fixation in the image data; and
merging the annotations from the plurality of users to establish a ground truth bounding box for the image data, wherein the object of fixation is based on the ground truth bounding box.

\* \* \* \* \*